US008554869B2

(12) United States Patent
Garg et al.

(10) Patent No.: US 8,554,869 B2
(45) Date of Patent: Oct. 8, 2013

(54) PROVIDING AN INTERFACE TO BROWSE LINKS OR REDIRECTS TO A PARTICULAR WEBPAGE (75) Inventors: Priyank S. Garg, San Jose, CA (US); Conrad Newman, Adelaide (AU); Amit Kumar, San Jose, CA (US); Vladimir Ofitserov, Foster City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1525 days.

(21) Appl. No.: 11/498,540

(22) Filed: Aug. 2, 2006

(65) Prior Publication Data

US 2008/0034059 A1 Feb. 7, 2008

(51) Int. Cl.
*G06F 15/16* (2006.01)
*G06F 7/00* (2006.01)

(52) U.S. Cl.
USPC .......................................... 709/217; 707/709

(58) Field of Classification Search
USPC ........................ 709/203, 217; 707/1, 3, 4, 6, 7
See application file for complete search history.

(56) References Cited

U.S. PATENT DOCUMENTS

| 5,890,172 | A | | 3/1999 | Borman et al. |
|---|---|---|---|---|
| 5,933,827 | A | * | 8/1999 | Cole et al. ............... 1/1 |
| 5,944,790 | A | * | 8/1999 | Levy .............. 709/218 |
| 6,604,143 | B1 | * | 8/2003 | Nagar et al. ........... 709/229 |
| 7,080,073 | B1 | * | 7/2006 | Jiang et al. ............. 707/7 |
| 7,266,762 | B1 | * | 9/2007 | Chakrabarti et al. ...... 715/205 |
| 7,546,530 | B1 | | 6/2009 | Shuster et al. |
| 7,668,821 | B1 | | 2/2010 | Donsbach et al. |
| 7,685,209 | B1 | | 3/2010 | Norton et al. |
| 2002/0013792 | A1 | | 1/2002 | Imielinski et al. |
| 2002/0073115 | A1 | | 6/2002 | Davis |
| 2003/0126560 | A1 | | 7/2003 | Kurapati et al. |
| 2003/0221162 | A1 | | 11/2003 | Sridhar |
| 2005/0256867 | A1 | | 11/2005 | Walther et al. |
| 2006/0059144 | A1 | | 3/2006 | Canright et al. |
| 2006/0101064 | A1 | | 5/2006 | Strong et al. |
| 2006/0161635 | A1 | | 7/2006 | Lamkin et al. |

(Continued)

OTHER PUBLICATIONS

Medynskiy, Y. et al., Using Hybrid Networks for the Analysis of Online Software Development Communities; Apr. 27, 2006; ACM; pp. 513-516.

(Continued)

*Primary Examiner* — David Lazaro
*Assistant Examiner* — Xiang Yu
(74) *Attorney, Agent, or Firm* — Hickman Palermo Truong Becker Bingham Wong LLP; Daniel D. Ledesma (57) ABSTRACT Disclosed herein is a technique for providing an interface that allows a user to navigate backwards through linked webpages. Initially, a request to display inlinks of linking webpages that contain a link to a particular webpage is received. In response to the request, a new page that contains a set of inlinks that correspond to a set of linking webpages that each contain a link to the particular webpage is provided. Each of the inlinks may be associated with a particular clickable item. An indication of a selection of a clickable item, associated with a particular inlink is received. In response, a second new page which contains a second set of inlinks that correspond to a second set of linking webpages that each contain a link to the webpage that corresponds to the particular inlink is provided. Some of the displayed inlinks may correspond to webpages that redirect to the particular webpage.

32 Claims, 6 Drawing Sheets

(56) References Cited

U.S. PATENT DOCUMENTS

| | | | |
|---|---|---|---|
| 2006/0242553 A1* | 10/2006 | Kulas | 715/501.1 |
| 2007/0067331 A1 | 3/2007 | Schachter et al. | |
| 2007/0078832 A1 | 4/2007 | Ott et al. | |
| 2007/0106721 A1 | 5/2007 | Schloter | |
| 2007/0130207 A1 | 6/2007 | Pate et al. | |
| 2007/0156636 A1 | 7/2007 | Norton et al. | |
| 2007/0226077 A1 | 9/2007 | Frank et al. | |
| 2007/0288454 A1 | 12/2007 | Bolivar et al. | |
| 2007/0288514 A1 | 12/2007 | Reitter et al. | |
| 2008/0114644 A1 | 5/2008 | Frank et al. | |

OTHER PUBLICATIONS

U.S. Appl. No. 11/491,365, filed Jul. 21, 2006, Final Office Action, Nov. 8, 2011.

U.S. Appl. No. 11/491,438, filed Jul. 21, 2006, Notice of Allowance, Nov. 25, 2011.

Metz Cade, "Flickr (Beta)", Mar. 2, 2005; PCMag.com; http://www.pcmag.com/article 2/0,2817,1771897,00.asp?tab-FullReview; Last Accessed Feb. 7, 2011; pp. 1-5.

Baker Jonny, "Flickr-Online Photo Sharing", Jan. 5, 2007; http://jonnybaker.blogs.com/jonnybaker/2006/01/flickr_online_p.html; last accessed Feb. 7, 2011; pp. 1-3.

Microsoft, "Microsoft Computer Dictionary", Fifth Edition, Microsoft Press, Dated May 1, 2002, 2 pages.

The Internet Archive, "Building an 'Internet Library", dated Nov. 30, 2001, 2 pages.

Mathes, A, "Folksonomies—Cooperative Classification and Communication Through Shared Metadata" Dec. 2004; University of Illinois, Urbana-Champaign; pp. 1-19.

Weignberger, D., "Tagging and Why It Matters," May 13, 2005; Harvard University; pp. 1-4.

Taylor, C., "An Introduction to Metadata;" Jul. 29, 2003; University of Queensland Library; 5 pages.

Milstein et al., "Google: The Missing Manual;" Mar. 10, 2006; O'Reilly Media; Second Edition; 34 pages.

* cited by examiner

PROVIDING AN INTERFACE TO BROWSE LINKS OR REDIRECTS TO A PARTICULAR WEBPAGE

FIELD OF THE INVENTION

The present invention relates to providing an interface to navigating backwards along a chain of web links given an initial webpage.

BACKGROUND

Web users, including owners of websites, (referred to hereinafter as "site owners") are interested in who is visiting a particular website and how often the particular website is visited. Such information is useful for generating advertisement revenue, determining what type of web content is attracting the most visitors, etc.

Site owners and researchers in general are also interested in web connectivity and how different sites on the World Wide Web are connected to each other. Beginning with a particular webpage, users may browse from the particular webpage to the webpages to which the particular webpage connects by following the "outlinks" on the particular webpage. However, users cannot browse in reverse, by finding who links (i.e., what webpages are linking) to the particular webpage and following the chain back.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A technique is described for providing an interface that allows a user to determine which other webpages link to a particular webpage and to navigate backwards along a link "chain" to those other webpages.

Being able to browse in reverse provides useful information. For example, site owners may discover related websites and/or users interested in their respective content. Site owners may also discover sources of possible traffic to their website. Furthermore, site owners may discover citations to their respective content and determine the context in which the citations were made.

According to one embodiment of the invention, using the interface, the user submits a query that specifies a URL of the particular webpage. In response, a set of inlinks is provided to the user. An example of an inlink is a URL of a linking webpage. Another example of an inlink is the title of the linking webpage. A linking webpage is a webpage that either (a) contains a link to the particular webpage or (b) is associated with the webpage that contains a link to the particular webpage. For example, although http://www.yahoo.com/movies may contain a link to the particular webpage, the inlink that is displayed may be http://www.yahoo.com, which is the URL of the website associated with http://www.yahoo.com/movies. Thus, a webpage that is associated with the webpage that contains the link may be the website, subdomain, domain, or top level domain associated with the webpage that contains the link.

Each inlink may be associated with a clickable item (e.g., entitled "Explore URL"). In response to the user's selection of the clickable item associated with a particular inlink, the interface may be refreshed to list other inlinks to the webpage that corresponds to the particular inlink. In this way, a user is provided with the ability to navigate up the link chain.

In one approach, the list of inlinks may be filtered to exclude inlinks from the same domain or host as the initial URL. This allows the user to distinguish between internal inlinks (i.e., inlinks from the same domain) and external inlinks (i.e., inlinks from different domains).

In one approach, some or all of the inlinks in the list of inlinks pertain to webpages that redirect to the particular webpage rather than webpages that contain links to the particular webpage.

In one approach, some or all of the inlinks in the list of inlinks pertain to webpages that redirect to the website that corresponds to the particular webpage and/or redirect to other webpages of the website.

How Inlinks are Determined

Embodiments of the invention are not limited to any single technique for determining inlinks. There are multiple ways for determining such inlinks. For example, while crawling the World Wide Web (WWW), a web crawler may record, in a link database, each link from one webpage to another. Next, the web crawler may record the URLs cited in a particular webpage as attributes of that webpage. The domain and host of the webpages corresponding to the recorded URLs also may be recorded as attributes of the particular webpage. Subsequently, if a query, specifying a URL, is issued against the link database, then all the inlinks may be determined by matching the URL against each webpage's attributes. A query to determine all webpages connecting to a particular host or domain for website-wide inlinks may also be supported.

Chain of Links

Figure 1:
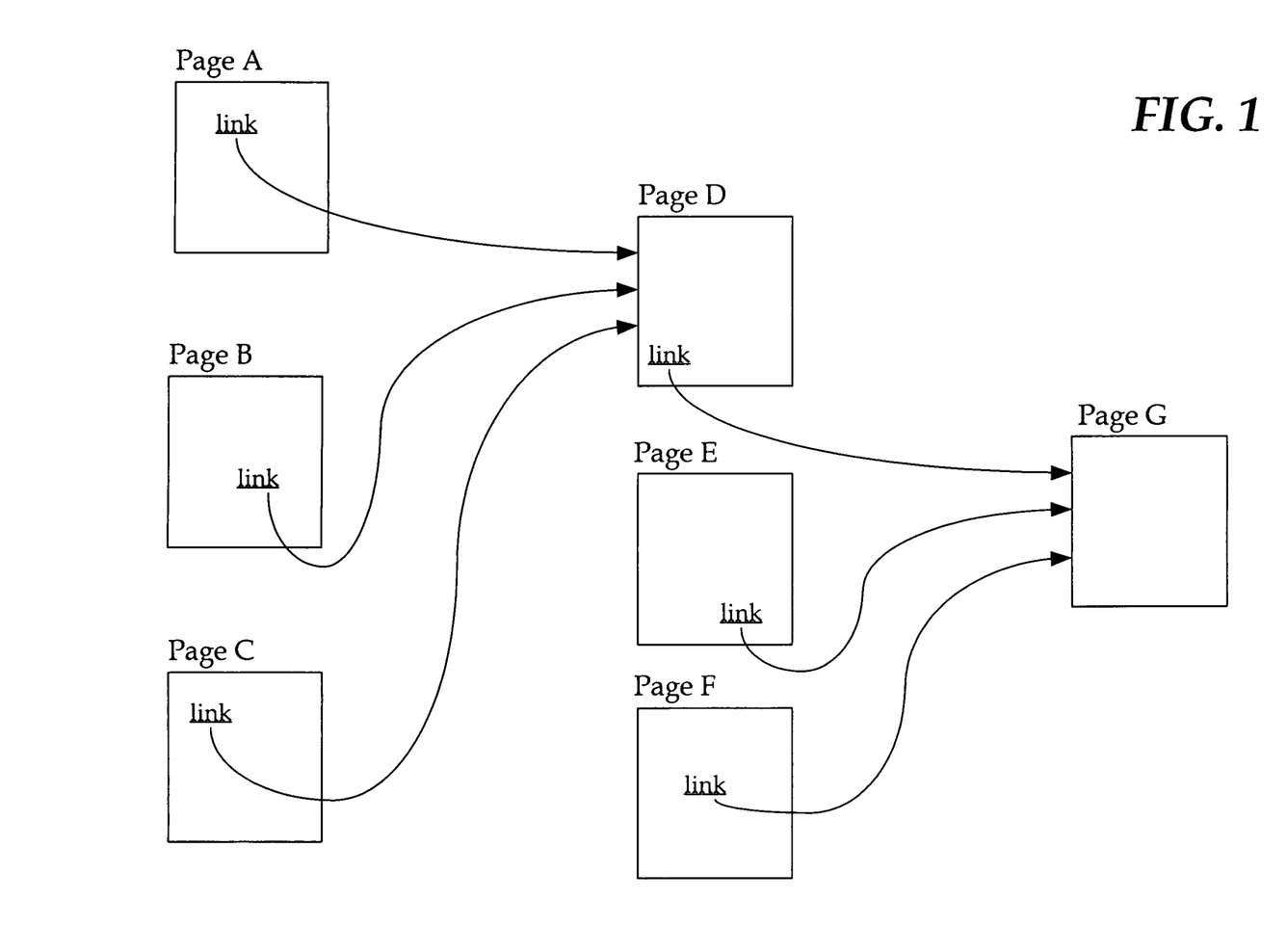
FIG. 1 is a flowchart that illustrates steps for providing, to a web browser, link information that pertains to a particular webpage, according to an embodiment of the invention.

FIG. 1 is a diagram that illustrates an exemplary chain of links to a page G, according to an embodiment of the invention. Although FIG. 1 depicts pages A-F with a single link to another page, pages A-G may contain any number of links to any number of other pages. According to FIG. 1, pages A-C each have a link to page D and pages D-F each have a link to Page G.

Providing a Chain of Links

Figure 2:
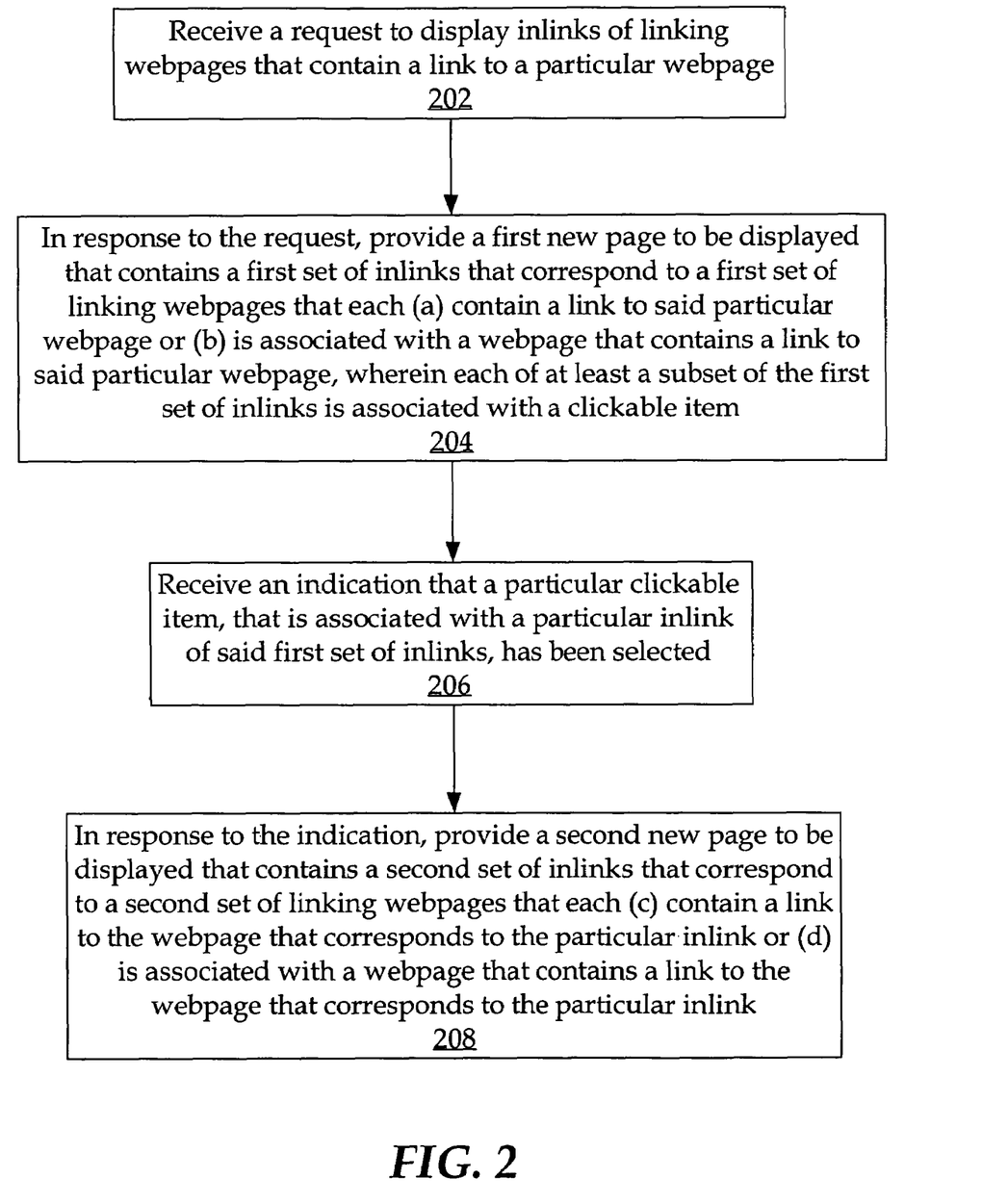
FIG. 2 is a diagram that illustrates an exemplary chain of links to a particular webpage, according to an embodiment of the invention.

FIG. 2 is a flowchart that illustrates steps for providing, to a web browser, link information that pertains to a particular webpage, according to an embodiment of the invention. At step 202, a request to provide inlinks of linking webpages that contain a link to a particular webpage (e.g. Page G in FIG. 1) is received from a user. At step 204, in response to the request, a first new page is provided to be displayed. The first new page contains a first set of inlinks that correspond to a first set of linking webpages (e.g. Pages D-F in FIG. 1). Each linking webpage in the set of linking webpages contains a link to the particular webpage. At least some of the inlinks in the first set of inlinks are associated with clickable items. At step 206, an indication of a user's selection of a particular clickable item that is associated with a particular inlink in the first set of inlinks is received. At step 208, in response to the receipt of the indication, a second new page is provided to be displayed. The second new page contains a second set of inlinks that correspond to a second set of linking webpages (e.g. Pages A-B in FIG. 1). Each linking webpage in the second set of linking webpages contains a link to the webpage that corresponds to the particular inlink.

Site Explorer

An online web-based application (that is accessible through a browser) that acts as the interface to navigate backwards from an initial webpage is referred to hereinafter as "Site Explorer". Site Explorer may contain a search field into which a user enters a URL for an initial webpage. After the user selects an "enter" button, for example, Site Explorer may list at least a subset of all known inlinks to the initial webpage corresponding to the entered URL.

Figure 3:
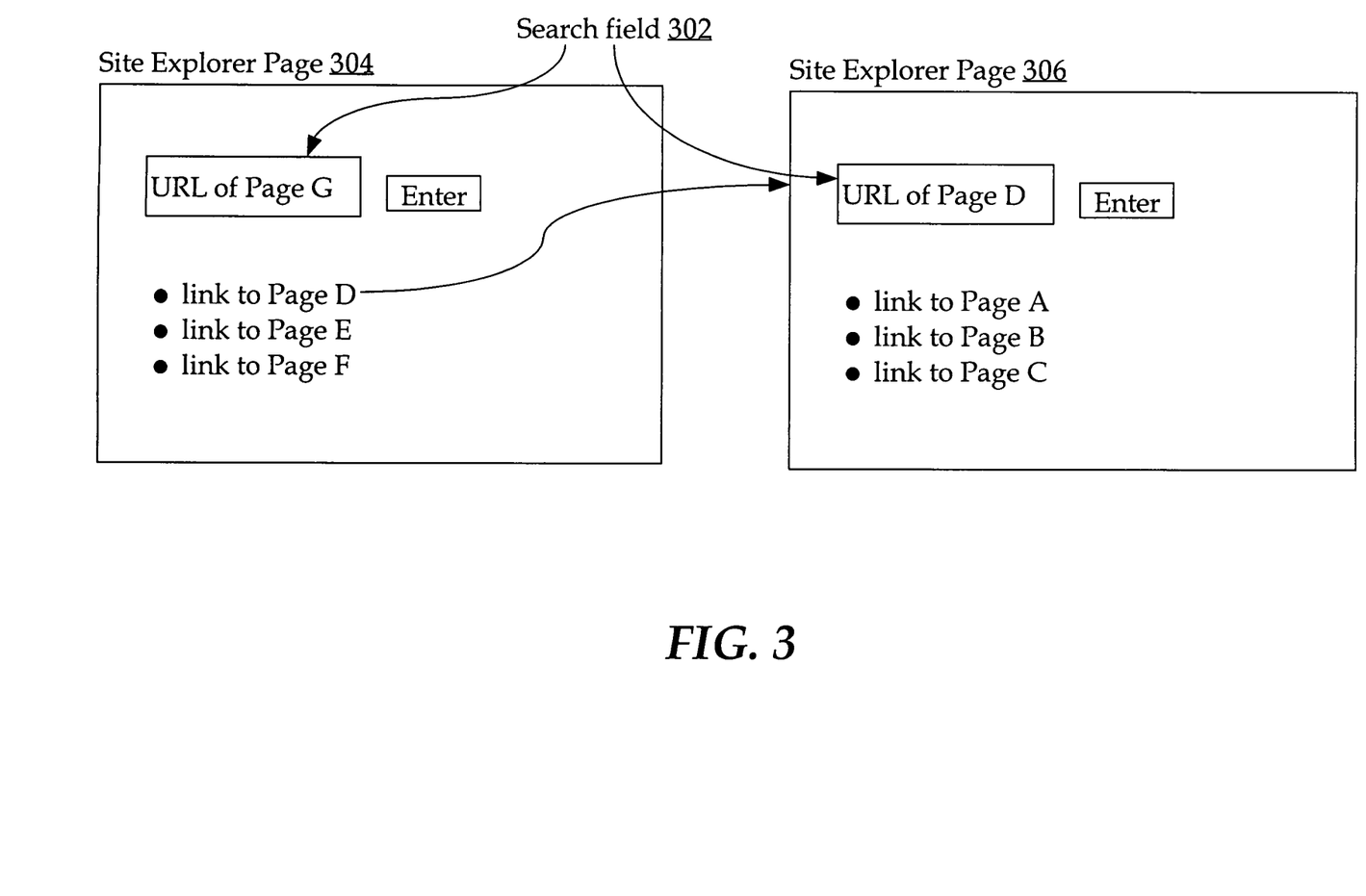
FIG. 3 is a diagram that illustrates how the exemplary chain of links may be traversed backwards, according to an embodiment of the invention.

FIG. 3 is a diagram that illustrates how the exemplary chain of links in FIG. 2 may be traversed backwards, according to an embodiment of the invention. Each of Site Explorer page 304 and Site Explorer page 306 comprise a search field 302 in which a user may specify a URL. Also, pages 304 and 306 comprise an enter button, as illustrated, that may be selected once a URL is specified by the user. In this example, once the user specifies the URL of page G in search field 302 of Site Explorer page 304, Site Explorer page 304 then displays the inlinks to page G. According to FIG. 1, the pages that contain a link to page G are pages D-F. Thus, a link to each of pages D-F is displayed in Site Explorer page 304.

If the user selects the link to page D, Site Explorer page 306 may be generated (e.g., in a new browser window). In this example, the URL of page D is automatically entered in search field 302 of Site Explorer page 306. Also, Site Explorer page 306 displays the inlinks to page D. According to FIG. 1, the pages that contain a link to page D are pages A-C. Thus, a link to each of pages A-C is displayed in Site Explorer page 306.

Figure 4:
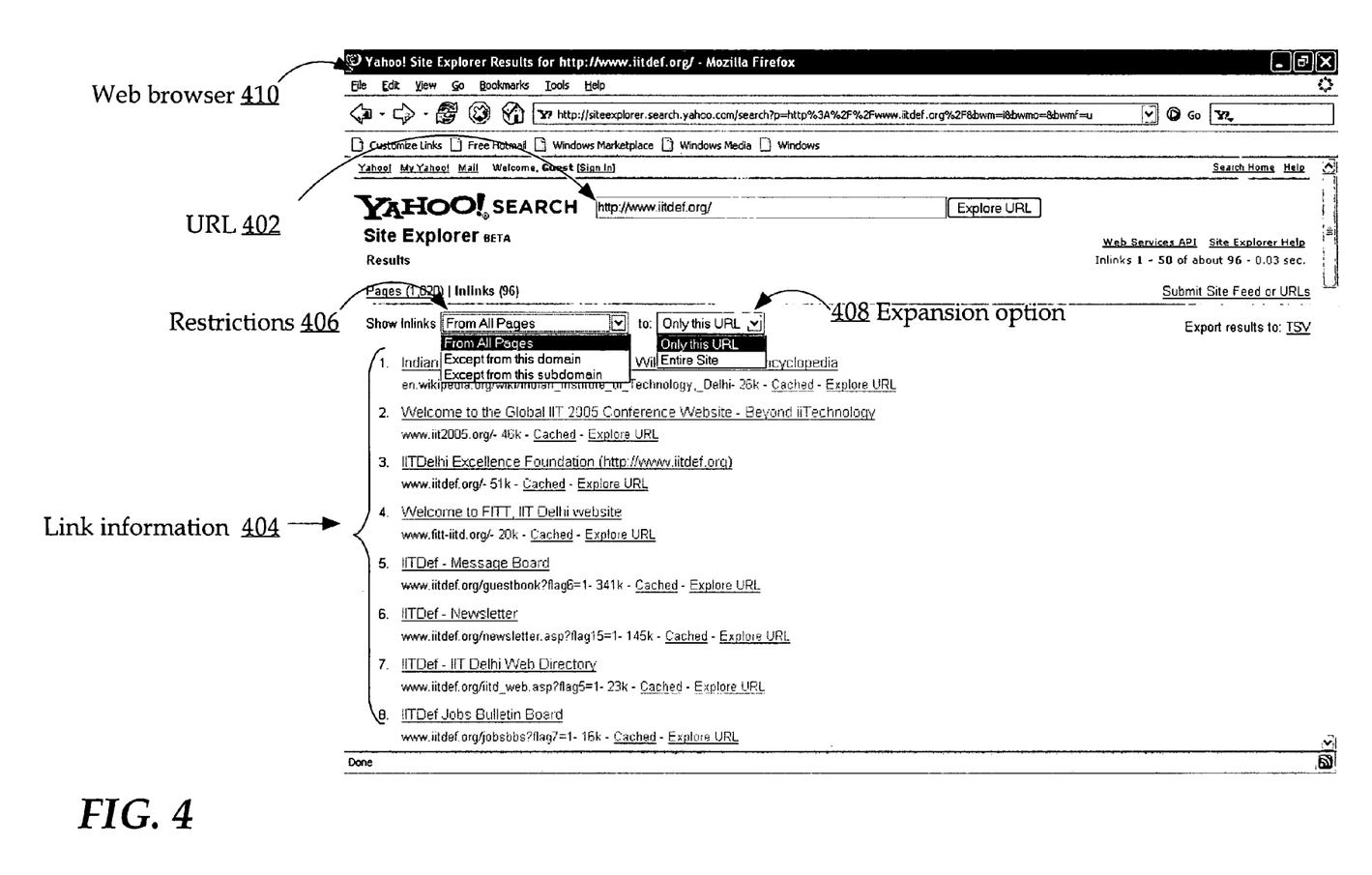
FIG. 4 is a diagram that illustrates how link information pertaining to a particular webpage may be displayed, according to an embodiment of the invention.

FIG. 4 is a diagram that illustrates a more detailed example of how Site Explorer may display link information 404 pertaining to a URL 402 in a web browser 410, according to an embodiment of the invention. In this example, URL 402 is http://www.iitdef.org. Link information 404 includes URLs of webpages that contain links to URL 402. Restrictions 406 may restrict the URLs specified in link information 404. Site Explorer may also include an expansion option 408 that allows a user or site owner of URL 402 to view link information 404 pertaining to all webpages associated with the website of URL 402, as opposed to just the webpage of URL 402.

The inlinks in link information 404 may be ordered based on which links were most recently created. Additionally or alternatively, the order of inlinks in Site Explorer may be based on the trust rank of the webpages that link to the webpage corresponding to URL 402. A trust rank of a particular webpage may be determined by an entity (e.g. Yahoo!™) that crawls the World Wide Web. A trust rank of a particular webpage may be based on multiple factors that may include, but are not limited to, (a) a number of webpages that link to the particular webpage, (b) what type of webpages link to the particular webpage (e.g. whether they are spam sites), (c) a number of user-created tags that have been associated with the particular webpage, (d) content of the particular webpage, and (e) the category/topic of the particular webpage.

Each of a subset of the listed inlinks in link information 404 is associated with a clickable item (see "Explore URL" in FIG. 4). One of these clickable items, when selected, may cause the browser in which Site Explorer is displayed to refresh or may cause a new window to be generated. The new page, when displayed, contains a set of inlinks corresponding to linking webpages that each contain a link to the inlink associated with the selected clickable item. For example, if the "Explorer URL" link associated with the second item in link information 404 (i.e. "www.iit2005.org") is selected, then a new page that contains all (or a subset of) inlinks to www.iit2005.org is provided. In this way, a user may navigate the Web backwards, beginning with an initial webpage, in a simple and user-friendly manner.

In one embodiment, for each link displayed in Site Explorer, additional information may be displayed. The additional information may include the link's anchor text. Anchor text is the visible text in a link. Anchor text tends to be highly relevant to the webpage to which the link connects. The additional information may alternatively (or also) include "surrounding text" that surrounds (or is adjacent to) the link and/or anchor text.

In one embodiment, the inlinks to a particular webpage or website are displayed in Site Explorer. The inlinks may be determined by crawling the entire searchable World Wide Web. Alternatively, the inlinks may be restricted in some manner. For example, the inlinks may be restricted to only shopping sites, non-spam websites, a list of websites specified by the webmaster of the displayed webpage, etc. As another example, the inlinks may be restricted from certain sites, such as websites owned or administered by the site owner of the webpage corresponding to URL 402.

In one embodiment, the inlinks may also be limited such that no two links are from the same domain. This restriction effectively weights one web publisher equal to another web publisher. The fact that one web publisher is constantly linking to the webpage corresponding to URL 402 might not be interesting to an end-user or the site owner of URL 402.

In some cases, multiple domains represent the same content, such as http://www.ycoolthing.com and http://ycoolthing.com. Therefore, in one embodiment, the inlinks may be restricted to webpages that contain unique content.

In one embodiment, a value, indicating a number of inlinks to the particular webpage or website, is displayed in Site Explorer (e.g., see FIG. 4). The value may change based on any restrictions (such as those discussed above) that are applied to the inlinks.

In FIG. 4, restrictions 406 include "From All Pages", the selection of which causes substantially all searchable webpages that contain a link to the webpage that corresponds to URL 402 to be listed. Restrictions 406 also include the "Except from this domain" restriction, the selection of which causes all webpages that contain a link to the webpage that corresponds to URL 402, except those webpages from the domain indicated by URL 402, to be listed. Restrictions 406 also include the "Except from this subdomain" restriction, the selection of which causes all webpages that contain a link to the webpage that corresponds to URL 402, except those webpages from the subdomain indicated by URL 402, to be listed. In this example, "From All Pages" is the default restriction, but any of the restrictions, including other restrictions mentioned above, may be the default restriction.

Redirect Information

HTTP Redirects, JavaScript Redirects, and Meta-refresh Redirects are mechanisms by which some Web servers inform the browsers that the user should be redirected to a different page. Redirects are used for various reasons. For example, redirects may indicate that the webpage a user is trying to load is now located elsewhere, either temporarily or permanently.

While current search engines may store this "redirect" information (i.e., that URL A redirects to URL B), they do not expose this information to users, since the information is of limited utility to end users. However, this information may be extremely helpful for site owners in order to optimize their respective websites for their users.

Therefore, in one embodiment of the invention, given a particular URL, one or more inlinks are displayed in Site Explorer. The one or more inlinks correspond to redirecting webpages that each redirect to the particular URL.

Figure 5:
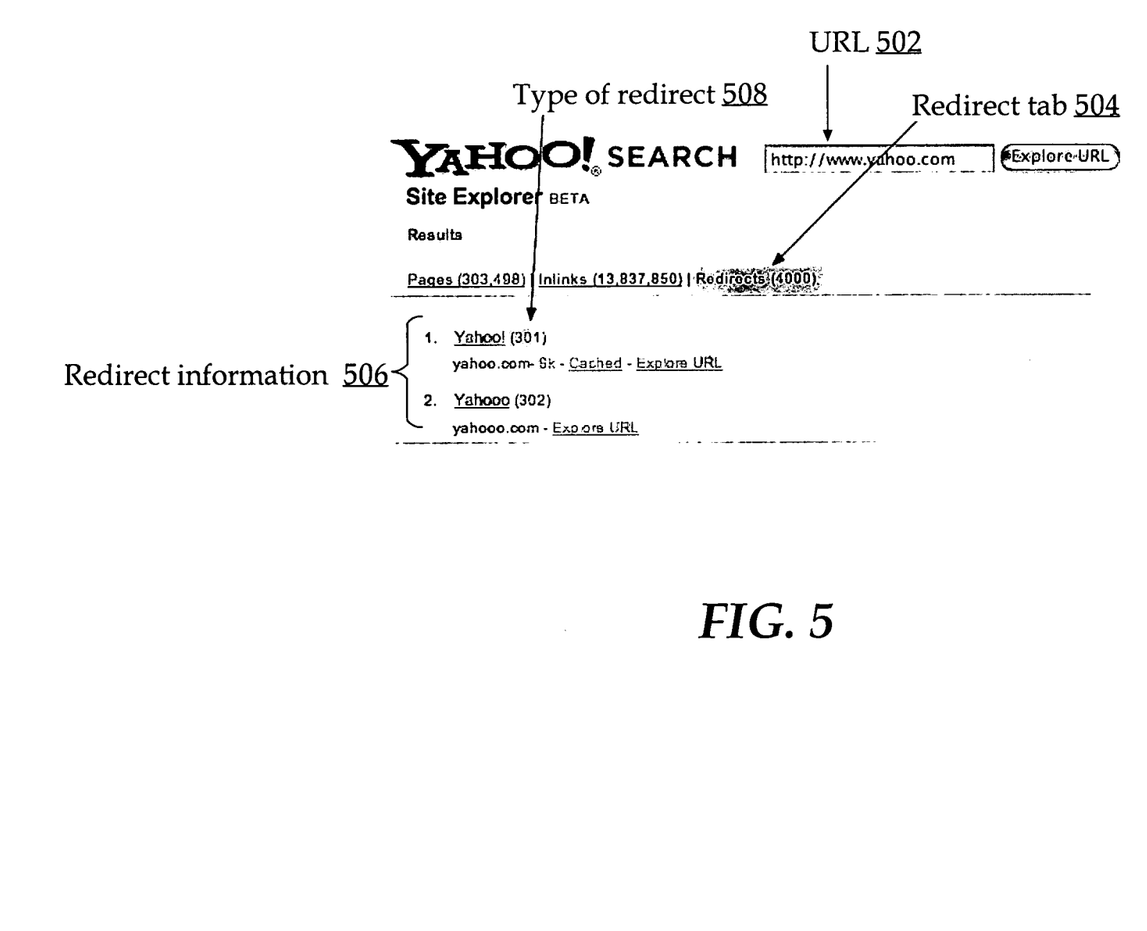
FIG. 5 is a diagram that illustrates how redirect information pertaining to a particular webpage may be displayed, according to an embodiment of the invention.

FIG. 5 is a diagram that illustrates how redirect information pertaining to a particular webpage may be displayed, according to an embodiment of the invention. In this example, URL 502 is http://www.yahoo.com. Site Explorer may contain a redirect tab 504 that, when selected, causes redirect information 506 to be displayed. However, in one embodiment of the invention, redirect tab 504 is not necessary to cause redirect information 506 to be displayed.

Redirect information 506 includes a reference to (e.g., URLs of) webpages that redirect to URL 502. In one approach, some or all of the references in redirect information 506 pertain to webpages that redirect to the domain of URL 502 including to URL 502 and other webpages of the website that corresponds to URL 502.

Redirect information 506 may also include a separate redirect type 508 for each URL in redirect information 506. Values for redirect type 508 may be, for example, '301', '302', 'javascript', etc.

Hardware Overview

Figure 6:
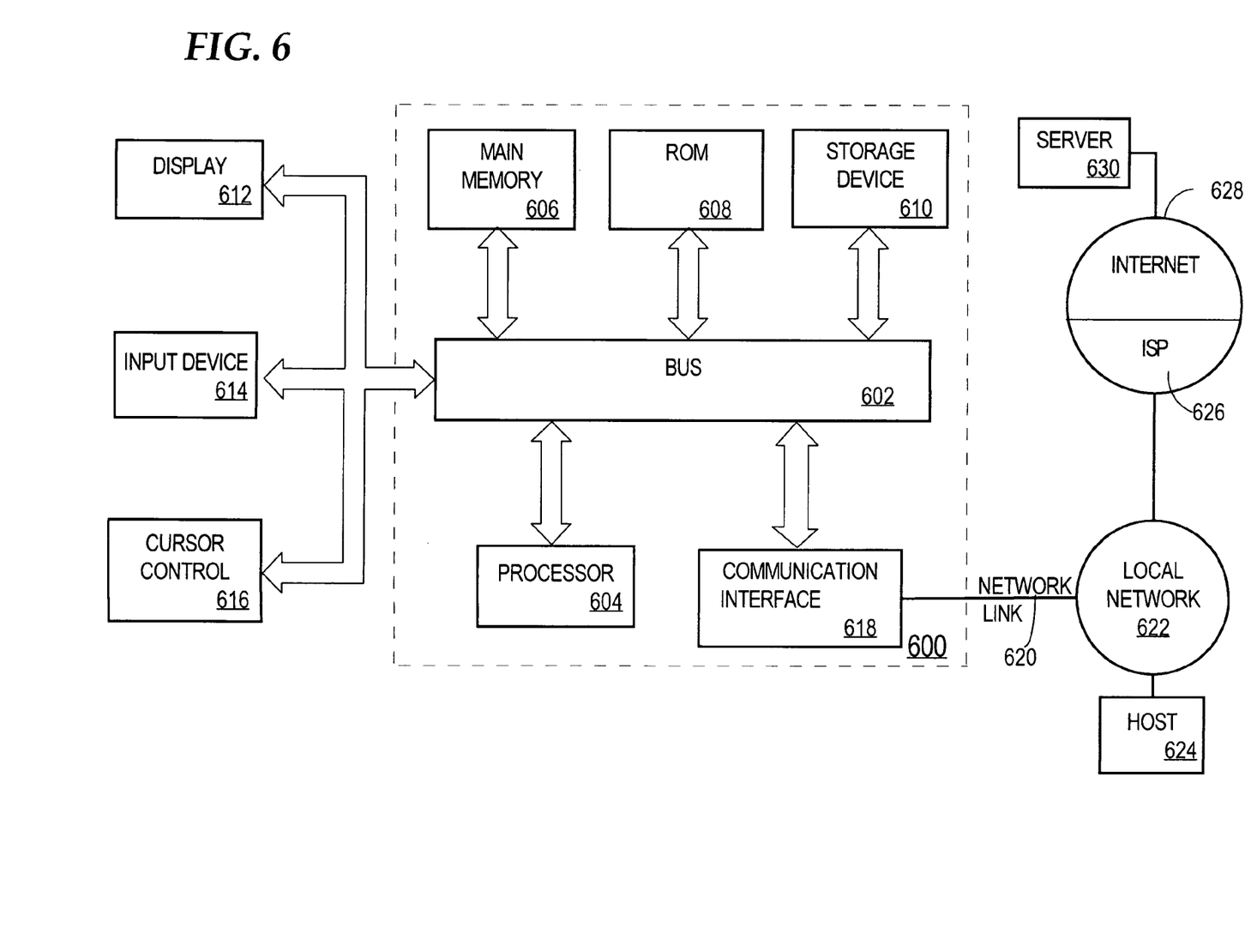
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the steps of:
receiving a request to display identities of linking entities that contain a link to a particular webpage, wherein the request comprises a name of the particular webpage or a uniform resource locator (URL) that identifies said particular webpage;
in response to receiving said request, providing a first new page to be displayed that identifies a first plurality of linking entities that each is a webpage or a website that contains a link to said particular webpage, wherein each of at least a subset of said first plurality of linking entities is associated with, on the first new page, a clickable item, wherein said first plurality of linking entities includes a first linking entity that is from a domain that is different than the domain of said particular webpage;
receiving an indication that a particular clickable item, that is associated with a particular linking entity of the first plurality of linking entities, has been selected; and
wherein receiving the indication is performed by a computing device;
in response to receiving said indication, providing a second new page to be displayed that identifies a second plurality of linking entities that is a webpage or website that contains a link to a webpage that corresponds to said particular linking entity.

2. The method of claim 1, further comprising:
receiving user input that indicates that the user only wants to see linking entities from domains that are different from the domain of the particular webpage; and
in response to receiving said user input, restricting said first plurality of linking entities to entities that are from domains that are different from the domain of the particular webpage.

3. The method of claim 1, further comprising:
receiving user input that indicates that the user only wants to see linking entities from subdomains that are different from a subdomain of the particular webpage; and
in response to receiving said user input, restricting said first plurality of linking entities to entities that are from subdomains that are different from the subdomain of the particular webpage.

4. The method of claim 1, wherein said first new page also identifies a third plurality of linking entities that each contain a link to a webpage, other than the particular webpage, on a same website to which said particular webpage belongs.

5. The method of claim 1, wherein the first and second pluralities of linking entities are determined from searching substantially the entire World Wide Web.

6. The method of claim 1, wherein each linking entity of said first plurality of linking entities is from a different domain.

7. The method of claim 1, wherein said first plurality of linking entities are limited to a certain category of information.

8. The method of claim 1, wherein other webpages that are owned by an owner of said particular webpage also link to said particular webpage, and further comprising filtering, in response to user input, said first plurality of linking entities to remove, from said first plurality, all entities that are owned by the owner of said particular webpage.

9. The method of claim 1, wherein each linking entity of said first plurality of linking entities contains content different from every other linking entity of said first plurality of linking entities.

10. The method of claim 1, wherein data that identifies the first plurality of linking entities is ordered based on linking entities that most recently added a link to said particular webpage.

11. The method of claim 1, wherein data that identifies the first plurality of linking entities is ordered based on a trust rank of each of the plurality of linking entities.

12. The method of claim 1, further comprising, for each linking entity of said first plurality of linking entities, providing, to be displayed on said first new page, at least one of (a) anchor text from said each linking entity or (b) text from said each linking entity that is adjacent to said anchor text.

13. The method of claim 1, wherein providing the first new page to be displayed further includes providing, to be displayed on said first new page, a value corresponding to a number of links to said particular webpage.

14. The method of claim 1, wherein the first new page also identifies one or more redirecting webpages that each, when requested, causes a browser to automatically redirect to said particular webpage.

15. A method comprising the steps of:
receiving a request to display identities of webpages that, when requested, causes a browser to redirect to a particular webpage, wherein the request comprises a name that is associated with said particular webpage or a uniform resource locator (URL) that identifies said particular webpage;
wherein receiving the request is performed by a computing device;
in response to receiving said request, providing a first new page to be displayed that identifies a first set of one or more entities that each is a:
(a) first redirecting webpage that, when requested, causes a browser to automatically redirect to said particular webpage or
(b) website that contains a second redirecting webpage that, when requested, causes a browser to automatically redirect to said particular webpage.

16. The method of claim 15, wherein:
each of at least a subset of said first set of entities is associated with, on the first new page, a clickable item;
the method further comprising the steps of:
receiving an indication that a particular clickable item, that is associated with a particular entity of said first set of entities, has been selected; and
in response to said indication, providing a second new page to be displayed that identifies a second set of entities that each is a:
(c) third redirecting webpage that, when requested, causes a browser to automatically redirect to a webpage that corresponds to said particular entity or
(d) website that contains a fourth redirecting webpage that, when requested, causes a browser to automatically redirect to the webpage that corresponds to said particular entity.

17. The method of claim 15, wherein each entity in a subset of the first set of entities is associated with a value that indicates a type of redirect that is used to redirect from said entity to said particular webpage.

18. The method of claim 15, further comprising:
receiving user input that indicates that the user only wants to see redirecting webpages from domains that are different from a domain of the particular webpage; and
in response to receiving said user input, restricting said first set of entities to entities that are from domains that are different from the domain of the particular webpage.

19. The method of claim 15, further comprising:
receiving user input that indicates that the user only wants to see redirecting webpages from subdomains that are different from a subdomain of the particular webpage; and
in response to receiving said user input, restricting said first set of entities to entities that are from subdomains that are different from the subdomain of the particular webpage.

20. The method of claim 15, wherein said first new page also identifies a second set of redirecting webpages that each, when requested, causes a browser to automatically redirect to a webpage of a website corresponding to said particular webpage.

21. The method of claim 15, wherein the first set of entities is determined from searching substantially the entire World Wide Web.

22. The method of claim 15, wherein each entity of said first set of entities is from a different domain.

23. The method of claim 15, wherein said first set of entities are limited to entities that are not owned by an owner of said particular webpage.

24. The method of claim 15, wherein data that identifies the first set of entities is ordered based on redirecting webpages that were most recently created.

25. The method of claim 15, further comprising, for each entity of said first set of entities, providing, to be displayed on said first new page, at least one of (a) anchor text from said each entity or (b) text from said each entity that is adjacent to said anchor text.

26. The method of claim 15, wherein providing the first new page to be displayed further includes providing, to be displayed on said first new page, a value corresponding to a number of redirects to said particular webpage.

27. A method comprising:
storing data that identifies a set of linking entities that each contains a link to a particular webpage;
after storing the data, receiving a request to display information about linking entities that contain a link to said particular webpage, wherein the request comprises a name that is associated with said particular webpage or a uniform resource locator (URL) that identifies said particular webpage;
wherein receiving the request is performed by a computing device;
in response to receiving said request:
based on one or more criteria, identifying a subset of said set of linking entities that each satisfies the one or more criteria,
wherein each linking entity in said set of linking entities is a webpage or website that contains a link to said particular webpage, and
providing a first new page to be displayed that identifies said subset of said set of linking entities, wherein the first new page does not identify a linking entity, in the set of linking entities, that does not satisfy the one or more criteria, wherein said set of linking entities includes a first linking entity that is from a domain that is different than the domain of said particular webpage.

28. One or more non-transitory storage media storing instructions which, when executed by one or more processors, cause the performance of the method recited in claim 1.

29. One or more non-transitory storage media storing instructions which, when executed by one or more processors, cause the performance of the method recited in claim 15.

30. One or more non-transitory storage media storing instructions which, when executed by one or more processors, cause the performance of the method recited in claim 27.

31. The method of claim 27, further comprising, prior to receiving the request, identifying, by a web crawler, which webpages contain a link to the particular webpage.

32. The method of claim 27, further comprising:
- receiving input that indicates that a user only desires to see linking entities that are from domains that are different relative to each other domain from which the linking entities belong; and
- in response to receiving said input, restricting said subset of said set of linking entities to entities that are from domains that are different relative to each other domain from which said entities belong.

* * * * *